United States Patent
Greene et al.

[11] Patent Number: 6,002,348
[45] Date of Patent: Dec. 14, 1999

[54] PILOT'S AID FOR DETECTING POWER LINES

[75] Inventors: Leonard M. Greene, White Plains, N.Y.; Randall A. Greene, Boulder, Colo.

[73] Assignee: Safe Flight Instrument Corporation, White Plains, N.Y.

[21] Appl. No.: 09/156,384

[22] Filed: Sep. 18, 1998

Related U.S. Application Data

[63] Continuation-in-part of application No. 09/078,533, May 13, 1998.

[51] Int. Cl.[6] .................................................. G08B 23/00
[52] U.S. Cl. ........................ 340/963; 340/945; 340/946; 340/964
[58] Field of Search .................................. 340/963, 964, 340/945, 946, 961; 701/14

[56] References Cited

U.S. PATENT DOCUMENTS

| | | | |
|---|---|---|---|
| 3,745,549 | 7/1973 | Jepperson et al. | 340/963 |
| 4,737,788 | 4/1988 | Kennedy | 342/29 |
| 4,902,126 | 2/1990 | Koechner | 356/5 |
| 4,916,445 | 4/1990 | Crossley | 340/946 |
| 5,210,586 | 5/1993 | Grage et al. | 356/5 |
| 5,252,912 | 10/1993 | Merritt et al. | 324/72 |
| 5,319,367 | 6/1994 | Schulte et al. | 340/961 |
| 5,351,032 | 9/1994 | Latorre et al. | 340/310.01 |
| 5,371,581 | 12/1994 | Wangler et al. | 356/5 |
| 5,465,142 | 11/1995 | Krumes et al. | 356/5.01 |

*Primary Examiner*—Jeffery A. Hofsass
*Assistant Examiner*—Toan Pham
*Attorney, Agent, or Firm*—Dougherty & Troxell

[57] ABSTRACT

An airborne power line detector and warning system includes a low frequency radio and antenna for detecting an AC signal of about 50 to 60 hertz. The system also includes a subsystem for producing a unique audio signal such as a series of clicks for warning a pilot that he is flying close to one or more power lines. In addition, the system includes a mute feature for muting the audio signal and replacing it with a visual signal. Finally, the system includes a gain sensor for replacing the audio signal at any time that the helicopter reduces its distance to a power line. An airborne power line detection and warning system which includes a second system or back up system is also disclosed. That system includes a GPS receiver and GIS data base to position a helicopter with respect to a power line grid and sound an alarm when the helicopter approaches a power line.

10 Claims, 2 Drawing Sheets

PILOT'S AID FOR DETECTING POWER LINES

This is a continuation-in-part of our U.S. application Ser. No. 09/078,533 which was filed on May 13, 1998.

FIELD OF THE INVENTION

The present invention relates to an airborne power line detector and warning system for alerting a pilot of the proximity of a power line; and more particularly to a system for providing a unique audible warning when the aircraft is approaching a power line. The system serves as an aid to a pilot who has the primary responsibility for visual detection of dangerous obstructions.

BACKGROUND FOR THE INVENTION

Low flying aircraft, especially helicopters, run the risk of colliding with electrical power transmission lines. These lines which are suspended from pylons, are not easy to see, and present a considerable hazard to such aircraft. One approach for detecting the proximity of a source of an alternating magnetic field, such as that emanating from a power line, is disclosed in the U.S. Pat. No. 4,362,992 of Young, et al. As disclosed therein, the system includes a sensor coil which is sensitive to the magnetic field. Processing means are responsive to the signal induced in the coil and produce a warning signal which is indicative of the proximity of the detected magnetic field. The system also includes cancelling means for cancelling the earth's field in the region of the sensor coil. As disclosed in the patent, the sensor coil may be one of a pair which are operable to provide a signal which is representative of the directional heading of the magnetic field.

A more recent approach for warning an aircraft pilot of a potential impact with a power line is disclosed in the United States Patent of Merritt et al., U.S. Pat. No. 5,252,912. The Merritt et al. system includes an antenna for sensing the electric field associated with a power line and producing an electric field signal. The system also includes means for generating a time-to-impact signal which is representative of the time for the aircraft to reach the power line if it were to continue on its path of movement. In this system, sensors are used to determine the direction of the power lines.

It is now believed that there may be a relatively large commercial market for an airborne power line detector and warning system in accordance with the present invention. There should be a relatively large demand because such systems are highly reliable and yet relatively inexpensive to manufacture and install. The systems in accordance with the present invention are of minimal weight and size, easy to install and service, durable, and at the same time provide a clear warning to a pilot that the aircraft is flying in a vicinity which is occupied by power lines. The system in accordance with a preferred embodiment of the invention also includes a built in back up system which operates independently of the first system and which is operable even though the power lines have been shut down. In addition to the above, it is believed that the power line detector and warning systems disclosed herein will overcome to a large degree the shortcomings of the prior devices, as will become apparent from a reading of the detailed description of the invention.

BRIEF SUMMARY OF THE INVENTION

In essence, the present invention contemplates an airborne power line detector and warning system for alerting a pilot to the proximity of a power line. The system includes a low frequency radio receiver and an antenna operatively connected to the receiver. The low frequency receiver and antenna are constructed and arranged for detecting an AC signal of about 50 to 60 hertz (Hz) which is generated and/or given off by power lines. The system also includes means capable of driving a speaker or headphones to produce a unique signal in response to the detected signal, and thereby warn a pilot of the proximity of a power line.

In a second embodiment of the invention, the means for producing a unique signal produces a series of clicks which are sufficiently loud as to be very apparent over the ordinary sound level in the cockpit. The frequency of the clicks is in relative proportion to the proximity of the power line(s). In addition, the second embodiment of the invention also includes means for muting the sound and producing a visual signal such as a flashing red light. The second embodiment of the invention also includes means for sensing any gain in signal strength to reconnect the audio signal, thereby cancelling the mute function.

Furthermore, a preferred embodiment of the invention includes a GPS (Global Positioning System) as a back up for the low frequency radio system. This back up system is operable even if no electricity is passing through the power lines. It is also operable upon failure of the system as described in connection with the first embodiment of the invention.

The invention also contemplates a method for warning a pilot of the proximity of power lines.

The invention will now be described in connection with the drawings wherein like reference numerals have been used to indicate like elements.

DETAILED DESCRIPTION OF THE PREFERRED EMBODIMENTS OF THE INVENTION

The present invention is based on the recognition that different types of radiation exist and that they differ in wave length and frequency as well as the origin of the radiation. For example, the waves of the lowest frequency and longest wave length are radio waves which are generated by oscillating electric current. The invention is also based on the recognition that the alternating current passing along power transmission lines oscillates at 60 hertz in the United States and at 50 hertz in Europe. Therefore, a low frequency or very low frequency radio and antenna can be adjusted to respond to a predetermined signal level.

It should also be recognized that the airborne power line detector and warning system disclosed herein is intended as an aid to a pilot of a helicopter or fixed wing aircraft. It acts as an aid to the pilot who has the primary responsibility for avoiding power lines based on visual observation. The system, in accordance with the present invention, should also be particularly useful for helicopter pilots, such as those who provide services which require landing and/or operation in the vicinity of power lines. For such pilots, an audible warning puts them on notice that they are flying in the vicinity of one or more power lines.

An airborne power line detector and warning system in accordance with the present invention will now be described in connection with FIGS. 1 and 2.

Figure 1:
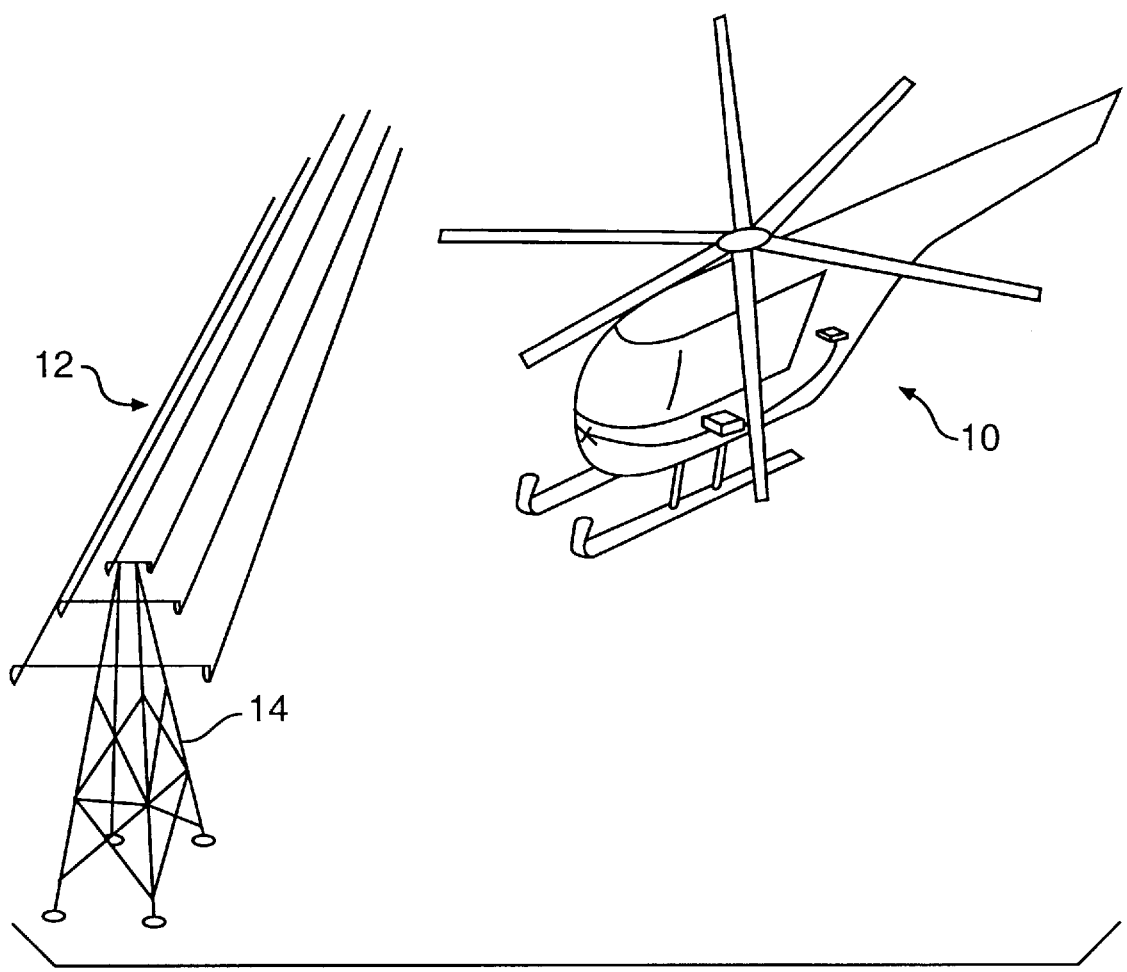
FIG. 1 is a schematic perspective view of a helicopter in the proximity of power lines wherein the helicopter includes a warning system in accordance with the present invention.
Figure 2:
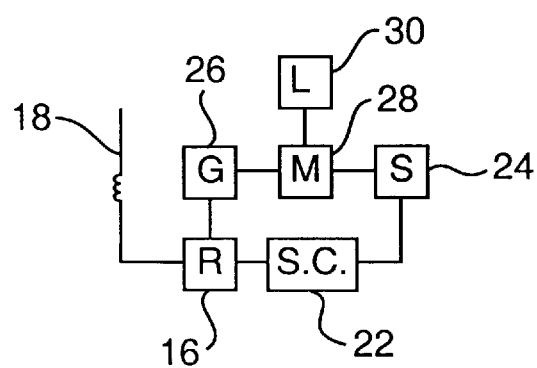
FIG. 2 is a diagrammatic view of a warning system in accordance with a second embodiment of the invention; and, FIG. 3 is a block diagram of the various components in a back up portion or subassembly for the airborne power line detector and warning system in accordance with a preferred embodiment of the invention.

Referring now to FIG. 1, a helicopter 10 is shown in proximity to a plurality of power lines 12. These power lines 12 are suspended from a tower 14 or the like in a conventional manner. In one embodiment of the invention, a low frequency radio 16 is tuned to a frequency of the power line, about 60 hertz, and is adapted to respond to a predetermined output level. This output level is produced when an aircraft flies within the proximity of one or more power lines and is a function of the amount of power being transmitted over the lines and the distance of the aircraft from the power lines. The output of the receiver is then an indication of distance.

The low frequency radio receiver 16 is operatively connected to an antenna 18 in a conventional manner. The receiver 16 is designed to select a signal of about 50 to 60 hertz from the signals which are available at the antenna. This is accomplished by tuning the receiver to the desired frequency by means of a conventional tuning circuit. For example, the tuning circuit typically includes a combination of inductance L and capacitance C, one or more of which are variable. The frequency F is then determined by the following formula wherein F is in hertz, L is in henries, and C is in farads.

$$F = \frac{1}{2\pi\sqrt{LC}}$$

Tuning the receiver is then done by changing the inductance or capacitance. When tuned, the circuit accepts the desired frequencies and rejects other frequencies. Also, because the incoming signal may be too weak to be directly used for any practical purpose, the receiver includes an amplifier so that the signal may be presented in usable form, as for example, directly or indirectly to a speaker or headphones.

The antenna 18 which is connected to the low frequency radio 16 may have a variety of different shapes and lengths as will be well understood by persons of ordinary skill in the art. However, a simple whip antenna and a VLF Radio (0.2–11 $KH_z$ were used in one embodiment of the invention). A VLF Radio receiver and antenna as described is available from S.P. McGreevy Productions of Lone Pine, Calif. 93545-0928.

The antenna 18 may be placed on the interior or the exterior of the aircraft and may be fixed to the body of the aircraft either directly, in the case of a nonconducted body, or by means of a suitable insulator.

In one preferred embodiment of the invention, the radio receiver feeds a signal to a signal converter 22 (labeled S.C. in FIG. 2) which produces a series of clicks similar to those produced by a Geiger counter. As the strength of the signal increases, the signal converter increases the frequency of the clicking sound to alert the pilot that the aircraft is approaching the power line.

The signal converter 22 may, for example, comprise a rectifier on an AGC circuit, which converts the radio signal into a linear DC signal and into a series of pulses. As the radio signal increases the DC signal, this operates a DC frequency converter which outputs square waves to drive an audio signal to thereby produce a series of clicks as will be well understood by a person of ordinary skill in the art. It is also contemplated that the series of clicks may be produced in a number of other ways, as for example, by a computer chip and sound board with appropriate programming.

The signal converter 22 produces a loud clicking sound by means of a suitable speaker 24 or headphones to thereby warn the pilot of the proximity of one or more power lines. The pilot is then alerted to visually identify the obstruction and avoid flying too close to the power line.

In helicopters of the type used for medical emergencies, it is frequently necessary to fly the aircraft, land and take off in an area that is near one or more power lines. It is also frequently necessary to wait on the ground, in the proximity of an accident, while one or more individuals are extricated from the accident and loaded onto the aircraft. Therefore, in a preferred embodiment of the invention, means such as a mute button 28 is provided for muting the sound from the warning system.

This means for muting the sound 28 may also be connected to a light 30 for producing a visual signal such as a continuous or pulsating red light when the audible signal is muted. For example, a two position manual switch may be provided in order to switch from an audible signal to a visual warning.

From a practical stand point, accidents can occur when an helicopter or other aircraft leaves the scene of an accident. For example, a pilot may become preoccupied with transporting an injured individual and forget about the proximity of power lines. The pilot might even overlook a flashing or continuous red light, particularly if a plurality of emergency vehicles with flashing lights are at the scene of the accident. For this reason, a preferred embodiment of the invention includes a gain sensor circuit 26 for detecting an increase in signal strength (due to a reduction in the distance between the aircraft and the power line) and for overriding the mute feature in the event of any such gain. By overriding the mute feature, a pilot is once again reminded of the danger of a nearby power line when the distance between the aircraft and power line decreases.

This system is also particularly advantageous for those pilots who must operate in the vicinity of power lines.

The gain sensor circuit 26 may, for example, include a simple level detector and comparative circuit. For example, when the mute button is pressed, it establishes a reference level. It establishes a reference level based on the strength of the D.C. voltage. Then, when the signal exceeds the reference signal, as for example, when the aircraft comes closer to a power line, it operates a switch that reconnects the audio signal. The circuit for the above may take a number of conventional forms, but would be tuned for the specific design of a warning system as will be well understood by a person of ordinary skill in the art.

Figure 3:
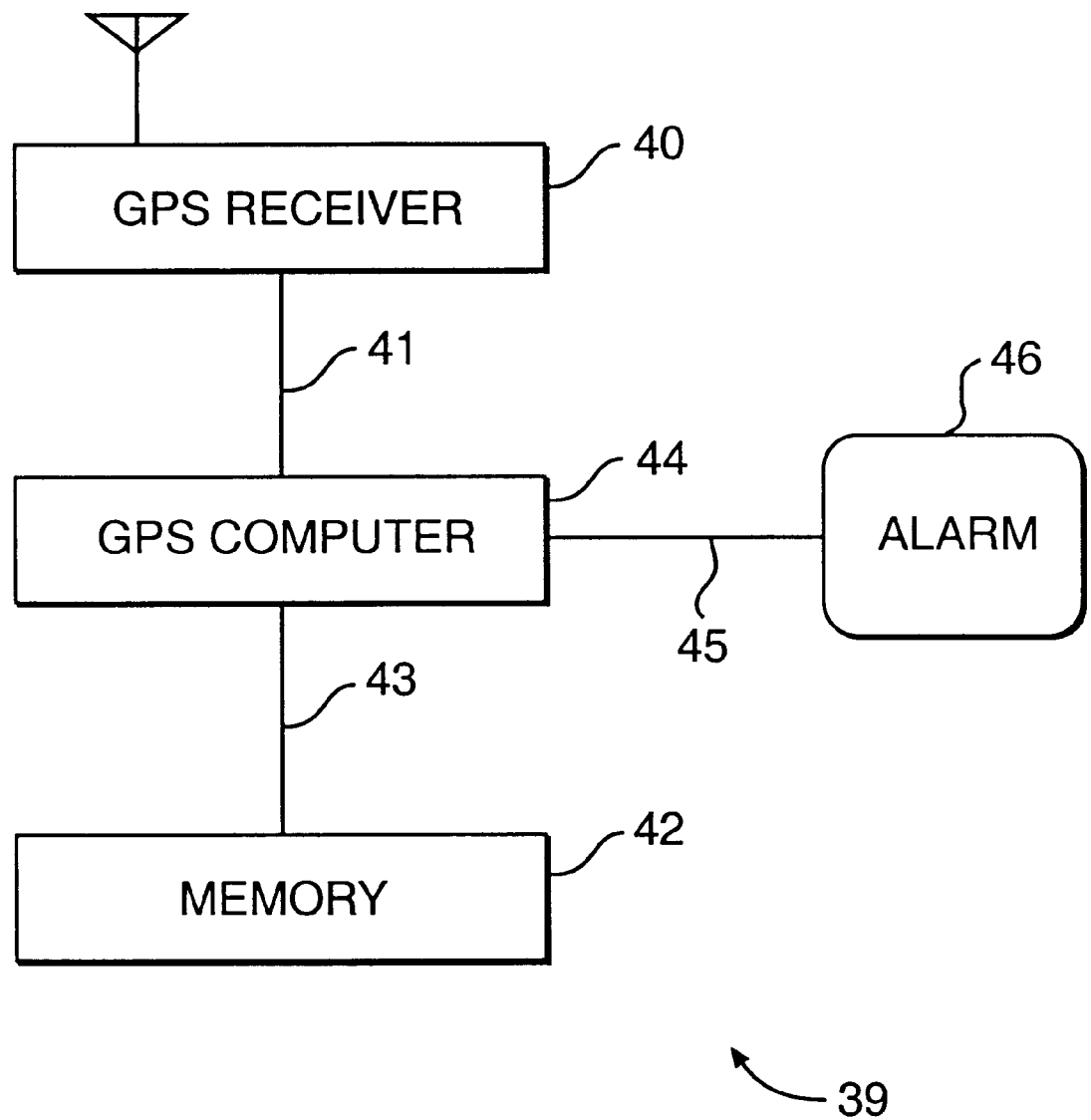

A further embodiment of the invention is illustrated in FIG. 3. As illustrated therein, the airborne power line detector and warning system for alerting a pilot to the proximity of a power line utilizes Global Positioning Satellites (GPS) (not shown) and a GPS receiver 40. The GPS and GPS receiver 40 determine the latitude, longitude and altitude of the aircraft, as for example, the helicopter 10 shown in FIG. 1. The system 39 also includes a Geographic Information System (GIS), data storage means or memory 42. This memory 42 or GIS includes a power line grid for a preselected geographical area. This power line grid includes the longitudinal and latitudinal coordinates for all of the power lines within the geographical area where the helicopter is operational.

Information from the G.P.S. receiver 40 is sent to a GPS computer 44 through a GPS communications link 41. The information from the GIS or memory 42 is sent to the computer 44 through a communications link 43.

When GPS position data is received by the GPS receiver 40, the position data is interpreted and transmitted to the GPS computer 44. This position data then locates the position of the helicopter or other aircraft with respect to its longitudinal, latitudinal and altitude in a conventional matter. The GIS system or memory 42 then provides the location of the power line grid including the power lines to the computer 44 by means of the link 43.

The computer 44 compares the location of the power lines with the location of the helicopter by means of a comparison program and generates a signal when the aircraft is within a preselected distance from one of the powerlines. This programming of the computer may be by conventional programming techniques and is well within the skill of a person of ordinary skill in the art. As illustrated in FIG. 3, the GPS computer 44 is connected to an alarm 46 by a link 45 so that a warning is generated by the alarm 46 to warn a pilot that he is approaching a power line.

The GPS computer 44 can also be programmed to increase the volume, frequency and/or intensity of the warning as the aircraft approaches or draws nearer to a power line. One advantage of this GPS generated alarm is that it will warn a pilot of the proximity of a power line even if there is no current in the line or if there is a problem with or failure of the low frequency radio 16.

While the invention has been described in connection with its preferred embodiments, it should be recognized that changes and modifications may be made therein without departing from the scope of the appended claims.

What is claimed is:

1. An airborne power line detector and warning system for alerting a pilot to the proximity of a power line, said system comprising a low frequency radio receiver and an antenna operatively connected to said receiver for detecting an AC signal of about 50 to 60 hertz emanating from a power line, means for converting a radio signal to a D.C. signal and means for producing an audio signal in response to said D.C. signal in order to warn a pilot of the proximity of a power line, means including a gain sensor circuit for detecting an increase in A.C. signal strength and means for warning a pilot that he is approaching a power line.

2. An airborne power line detector and warning system for alerting a pilot of the proximity of a power line, said system comprising a low frequency radio receiver and an antenna operatively connected to said receiver for detecting an AC signal of about 50 to 60 hertz emanating from a power line, means for converting a radio signal to a DC signal and means for producing an audio signal in response to said DC signal in order to warn a pilot of the proximity of a power line, manually operable means for muting the audio signal and a gain sensor circuit means for detecting an increase in signal strength emanating from the power line and for overriding the means to mute the audio signal in response to any such gain to thereby remind a pilot of the danger of a power line.

3. An airborne power line detector and warning system according to claim 2 in which said audio signal comprises a series of clicks.

4. An airborne power line detector and warning system according to claim 3 which includes means for increasing the frequency of the series of clicks as the aircraft approaches a power line.

5. A airborne power line detector and warning system according to claim 2 which includes means for replacing a muted audio signal with a visual signal.

6. An airborne power line detector and warning system for alerting a pilot of the proximity of a power line, said system comprising means for detecting an AC signal emanating from a power line, means for producing an audio signal in response thereto for alerting a pilot of the proximity of a power line and manually operable means for muting the audio signal and replacing the muted signal with a visual signal, and gain sensor circuit means for detecting an increase in signal strength emanating from the power line and for overriding the means to mute the audio signal in response to any such gains to thereby remind a pilot of the danger of a power line.

7. An airborne power line detector and warning system for alerting a pilot of an aircraft to the proximity of a power line, said system including first, and second detecting means, said first detecting means including a low frequency radio receiver and antenna operatively connected to said receiver for detecting an AC signal of about 50 to 60 hertz emanating from a power line, means including a gain sensor circuit for detecting an increase in AC signal strength and means for converting a radio signal to a D.C. signal; and means for converting a radio signal to a DC signal;

said second detecting means comprising data storage means having a power line grid with the geographical location of all of the power lines within a selected geographical area stored therein, a positioning system for receiving and demodulating signals for determining the present position of an aircraft, means for comparing the position of the aircraft with the location of the power lines and for producing a signal when the aircraft is within a preselected distance from a power line; and means for producing an audio signal in response to a signal from either of said first or second detecting means in order to warn a pilot of the proximity of a power line.

8. An airborne power line detection and warning system for alerting a pilot of an aircraft to the proximity of a power line, said system including first and second detecting means, said first detecting means including a low frequency radio receiver and antenna operatively connected to said receiver for detecting an AC signal of about 50 to 60 hertz emanating from a power line, and means for converting a radio signal to a DC signal;

said second detecting means comprising data storage means having a power line grid with the geographical location of all of the power lines within a selected geographical area stored therein, a positioning system for receiving and demodulating signals for determining the present position of an aircraft, means for comparing the position of the aircraft with the location of the power lines and for producing a signal when the aircraft is within a preselected distance from a power line; and means for producing an audio signal in response to a signal from either of said first and second detecting means in order to warn a pilot of the proximity of a power line, manually operable means for muting the audio signal and a gain sensor circuit means for detecting an increase in signal strength emanating from the power line and for overriding the means to mute the audio signal in response to any such gain to thereby remind a pilot of the danger of a power line.

9. An airborne power line detector and warning system according to claim 8 which includes means for replacing a muted audio signal with a visual signal.

10. An airborne power line detector and warning system according to claim 9 in which said audio signal comprises a series of clicks.

* * * * *